(12) United States Patent
Liu et al.

(10) Patent No.: US 7,217,458 B2
(45) Date of Patent: May 15, 2007

(54) STRENGTH-ENHANCED, LIGHTWEIGHT LIGNOCELLULOSIC COMPOSITE BOARD MATERIALS AND METHODS OF THEIR MANUFACTURE

(75) Inventors: Feipeng Liu, Statham, GA (US); Brian M. Peek, Cornelia, GA (US); Kelly R. Flaherty, Braselton, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 377 days.

(21) Appl. No.: 10/619,449

(22) Filed: Jul. 16, 2003

(65) Prior Publication Data

US 2005/0019548 A1    Jan. 27, 2005

(51) Int. Cl.
*B32B 27/00* (2006.01)

(52) U.S. Cl. .................. 428/423.1; 428/325; 428/326; 428/327; 428/332; 524/507; 524/589; 524/590; 524/591

(58) Field of Classification Search ............. 428/423.1, 428/325, 326, 327, 332; 524/507, 589, 590, 524/591
See application file for complete search history.

(56) References Cited

U.S. PATENT DOCUMENTS

| | | | |
|---|---|---|---|
| 3,515,569 A | 6/1970 | Walters et al. | |
| 3,707,434 A | 12/1972 | Stayner | |
| 3,857,731 A | 12/1974 | Merrill, Jr. et al. | |
| 4,013,810 A | 3/1977 | Long | |
| 4,134,848 A | 1/1979 | Adicoff et al. | |
| 4,250,136 A | 2/1981 | Rex | |
| 4,661,301 A | 4/1987 | Okada et al. | |
| 4,722,943 A | 2/1988 | Melber et al. | |
| 4,726,986 A | 2/1988 | Cannady, Jr. et al. | |
| 4,753,831 A | 6/1988 | Hosoyamada et al. | |
| 4,944,823 A | 7/1990 | Stofko | |
| 5,554,429 A | 9/1996 | Iwata et al. | |
| 5,600,930 A * | 2/1997 | Drucker | 52/585.1 |
| 5,888,642 A | 3/1999 | Meteer et al. | |
| 5,935,699 A | 8/1999 | Barber | |
| 6,127,457 A | 10/2000 | Darling | |
| 6,133,330 A | 10/2000 | Weiser et al. | |
| 6,136,408 A | 10/2000 | Radcliffe et al. | |
| 6,171,688 B1 * | 1/2001 | Zheng et al. | 428/313.5 |
| 6,251,979 B1 | 6/2001 | Luongo | |
| 6,420,034 B1 * | 7/2002 | Takahashi et al. | 428/423.1 |
| 6,479,127 B1 | 11/2002 | Kornicer et al. | |
| 6,518,333 B2 | 2/2003 | Liu et al. | |

OTHER PUBLICATIONS

"Dualite . . . Your best choice in lightweight microspheres . . . ," Product Brochure, Jun. 1992, 4 pages, Pierce & Stevens Corp., Buffalo, N.Y., USA.

Lenth, ChristopherA., et al., "Investigations of Flakeboard Mat Consolidation,," Wood and Fiber Science, Apr. 1996, 153-167, 28(2), Soc. of Wood Sci. & Techn.

"Dualite Product Information M6001AE," Product Brochure, Jul. 1999, 1 page, Pierce & Stevens Corp., Buffalo, N.Y., U.S.A.

Dualite Product Information M7020, Product Brochure, Jul. 1999, 1 page, Pierce & Stevens Corp., Buffalo, M.Y., U.S.A.

"3M™ Microspheres," Product Brochure, Sep. 2000, 6 pages, 3M Specialty Materials, St. Paul, Minnesota, U.S.A.

"Eccosphere® Microspheres Macrospheres," Product Brochure, 2001 (month unknown), 10 pages, Emerson & Cuming Composite Materials, Inc., Canton, Massachusetts, U.S.A.

* cited by examiner

*Primary Examiner*—Leszek Kiliman
(74) *Attorney, Agent, or Firm*—Carlos Nieves; Raymond Hoch

(57) ABSTRACT

Lighweight lignocellulosic board materials, such as oriented strand board and others, having reduced densities while maintaining suitable mechanical properties, and methods for their manufacture.

15 Claims, 2 Drawing Sheets

FIG. 1

STRENGTH-ENHANCED, LIGHTWEIGHT LIGNOCELLULOSIC COMPOSITE BOARD MATERIALS AND METHODS OF THEIR MANUFACTURE

FIELD OF THE INVENTION

The present invention relates to lightweight lignocellulosic composite board materials, such as oriented strand board and the like, having reduced densities and sustained mechanical properties like bending strength, and methods of their manufacture.

BACKGROUND OF THE INVENTION

Oriented strand board ("OSB") is commercially available. OSB material generally is formed of multiple layers of wood "flakes" or "strands" bonded together by a resin binder under heat and compression to provide a unitary board structure. The flakes are made by cutting logs into thin slices with a knife edge oriented parallel to the length of a debarked log. The cut flakes are broken into narrow strands generally having lengths oriented parallel to the wood grain that are larger than the strand widths.

In one common fabrication of oriented strand board, the flakes generally are first dried to remove water, and are then coated in a blender with a thin layer of binder and sizing agent. The coated flakes are then spread on a conveyor belt to provide a surface ply or layer having flakes oriented generally in line with the conveyor belt, then one or more plies that will form an interior ply or plies of the finished board is (are) deposited on the surface ply such that the one or more plies is (are) oriented generally perpendicular to the conveyor belt. Then, another surface ply having flakes oriented generally in line with the conveyor belt is deposited over the intervening one or more plies having flakes oriented generally perpendicular to the conveyor belt. The resulting structure includes plies having flakes oriented generally perpendicular to a neighboring ply insofar, such as for each surface ply and the adjoining interior ply. The layers of oriented "strands" or "flakes" are finally exposed to heat and pressure to bond the strands and binder together to form a consolidated board structure. Other variations on this basic manufacturing scheme also are known, such as, for example, shown in U.S. Pat. No. 6,479,127 B1. The resulting product is then cut to size and shipped. Typically, the resin and sizing agent comprise less than 10% by weight of the oriented strand board.

The manufacturing control that can be achieved in lignocellulosic composites is strongly influenced by the quality of raw materials used. Plywood products typically use peeled veneers to make laminated structural composites, such that less wood compression is required to achieve the engineered strength design value. In general, the wood compressive ratio of plywood is in a range from 1.05 to 1.15, which means that the density of plywood is normally 5% to 15% higher than raw wood materials. For example, the density of plywood made of southern pine will be around 35 to 38 pounds per cubic feet (pcf).

In contrast, oriented strand boards (OSB) are mainly composed of much shorter wood strands or flakes, polymeric binders, and water repellent agents. Technically, to meet the strength requirement, a much higher compressive ratio is needed to permit OSB to have equivalent strength performance as plywood. The preferred compressive ratio for OSB is in a range from 1.15 to 1.30. The current density range for making commercial southern pine OSB is generally around 42 to 45 pounds per cubic feet (pcf) to meet the mechanical and structural requirements for its applications.

Southern pine, which also is often referred to as Southern Yellow Pine, typically is considered as the group of pines including Longleaf pine (*Pinus palustris* Mill.), Shortleaf pine (*P. echinata* mill.), Loblolly pine (*P. Taeda* L.), and Slash pine (*P. elliottii* Engelm.)

There is an increased use of OSB made of southern pine to replace traditional plywood in the building and construction industry, especially in residential construction. The commercial OSB products are widely used for the roof-decking, wall-sheathing, and sub-flooring applications, concrete forming, among other uses. Some commercial OSB products outperform plywood in term of dimensional stability and mechanical strength performance. The bending strength of OSB can be, for example, 10–20% more than the commodity plywood with less warping and equivalent thickness swelling to plywood. Bending strength is one of the most important engineering parameters in determining the engineering design value of boards to be used in building construction.

In comparing various attributes of OSB with plywood, one of the OSB drawbacks in term of applications is that the weight of current commercial OSB is often about 10–20% heavier than that of similarly-dimensioned panels of plywood. The higher OSB weight relative to plywood is a concern among builders and other users of the products, especially where the product must be transported and handled by hand, such as on roofs and in other construction sites, and so forth. Consequently, a lighter weight OSB that maintains requisite strength performance would be very desirable to builders and others doing construction and the like with board materials.

However, in general, when the density of composite lignocellulosic materials is reduced, the mechanical properties also tend to be reduced simultaneously. Thus, a need has existed for a technique for reducing OSB density or weight for a given panel size without causing a concurrent loss in useful OSB mechanical properties.

Efforts have been made in the past to address the above density and strength concerns in composite boarding. For example, U.S. Pat. No. 5,554,429 to Iwata et al. describes a method for using a foaming binder in a wood board formulation that is a mixture of a foaming resin and a non-foaming resin at a ratio within a range of 4:1 to 1:4. The manufactured OSB is described as having a particular resistance to moisture content with low density and high strength. However, the use of specialty foaming binders in place of normally used consolidation resins can increase manufacturing cost and process and product quality control issues and complexity for board processing.

Another consideration in the fabrication of wood flake mats in commercial oriented strand board is the common practice of discontinuously bonding strands together to form the mats such that significant void spaces remain in the product. These voids can significantly impact the process control and ultimate mechanical properties of the final mat product. The size and shape of these voids that arise in flake boards comprised of discontinuously bonded lignocellulosic wood strands and the like affects the horizontal and vertical density distributions within the panel, as well as the mechanical properties, which is significantly affected by the distribution of voids. Many of these voids can be visually observed in the flake board product. Consequently, flake boards such as OSB are typically composite structures in which the wood component thereof typically constitutes the primary component thereof and which include voids or air spaces.

Various low-density filler materials have been used to reduce the density of fiber-reinforced composite materials or syntactic foam composite materials. Hollow microspheres are a popular low-density filler material. They generally can be hollow glass microspheres, hollow ceramic microspheres, hollow polymeric microspheres, or perlite. The development of microsphere technology has been very active in recent years.

Microsphere materials have been used in various applications including fiber reinforced plastic compounds for bathwares, marine substance, patching including compounds for plywood and gypsum wall boards, modeling clays for art and architectures, building materials for lightweight and reinforcement of gypsum boards, sound attenuation, explosives, reinforced epoxy resin foams, textile printing inks, paper additives, adhesive and sealant fillers, lightweight concrete, wire cables, cosmetics, pharmaceuticals for drug delivery, aerospace syntactic foam panels, deep submarine vehicles, machine tooling materials, and flow line insulation materials for oil drilling, and so forth.

U.S. Pat. No. 6,171,688 B1 to Zheng et al. describes syntactic foams comprising a fiber-reinforced composite including a polymer matrix, polymer microspheres, glass microspheres, dried natural fibers, and wood flour. The '688 patent states that in most cases the materials are mixed to a puttylike state or to a state in which the material can just be cast. The examples in the '688 patent describe polyester resin as the predominant component and kenaf fiber as a non-predominant component in all formulations used to make board. The dried natural fibers are described as being plant fibers, such as kenaf fibers, having hairy projections along their length and a width dimension of between 40 to 60 microns (0.04 to 0.06 mm) and lengths between about 2.5 cm.

Kenaf fiber is a natural lignocellulosic plant material with an annual growth season, which after being oven-dried to less than 2% moisture content, is directly mixed with other composite ingredients. No dimensional reduction is typically required for kenaf fibers before using them in the syntactic foam formulations. Kenaf-fiber reinforced composites are known that are used as interior decorative panels in non-structural applications where board strength is not an important design consideration.

There is a need for improvements in the flake board technology in particular that would permit weight reductions, and alleviate the above-discussed void structure related problem associated with OSB composite board structures and the like, without making compromises in board strength.

SUMMARY OF THE INVENTION

The present invention relates to lightweight lignocellulosic composite board materials having reduced board density while maintaining good structural strength by introduction of a low-density filler comprising hollow or cellular microspheres in the board-forming composition.

In one embodiment, there is a lignocellulosic composite board material comprising a mixture of a cured polymeric binder, hollow microspheres contacted at surfaces thereof with the binder; and predominantly lignocellulosic wood pieces, wherein the wood pieces are discontinuously bonded together with the binder. In one preferred embodiment, the lignocellulosic composite board material is formed with wood pieces that are wood strands to provide an oriented strand board (OSB).

In one embodiment of the present invention, a density reduction of at least a 5% reduction is achievable in composite lignocellulosic panels, like oriented strand board, without encountering bending strength reductions, as compared to making the same dimensioned panel with the same composition except without the microspheres.

In another aspect, the lignocellulosic composite is oriented strand board having (OSB) a void volume of at least 5%, particularly more than 10%, where this void volume is not attributable to the microspheres or any foam cells present. Indeed, the lignocellulosic composite boards of the present invention do not require nor even preferably use foaming binders. The invention is particularly applicable to lignocellulosic composites made with southern pine strands or flakes sprayed partially with a thermosetting resin containing the microspheres and consolidated into a unitary board containing voids.

In one instance, incorporation of the hollow or cellular microsphere filler in OSB plies comprising furnishes of southern pine flakes and strands, and a thermosetting resin, effectively reduces the density of the consolidated panel made with those plies to less than 40 pounds per cubic feet (pcf), where it otherwise would have been 42 or more pcf if made with the same board-forming compositions except omitting the microspheres, and without loss in bending strength.

In one non-limiting aspect, the bending stiffness of the composite board of an embodiment of this invention exceeds 21,000 lb·in$^2$/ft, and generally ranges from about 21,000 to about 30,000 lb·in$^2$/ft. Unless indicated otherwise herein, the bending stiffness is determined according to ASTM D1037-98.

In one preferred embodiment, the consolidated OSB panel of the invention comprises i) generally about 70 to about 96 wt %, preferably about 75 to about 90 wt %, dried lignocellulosic material; ii) about 20 to about 0.8 wt %, preferably about 15 to about 5 wt %, total cured polymeric binder; iii) about 12 to about 0.9 wt %, preferably about 5 to about 1 wt %, hollow microspheres; and iv) about 3 to about 0.8 wt % additional additives. The additional additives can include, for example, a water-repellant, such as slack wax. Also, wood flour is preferably used in certain processing approaches described herein. In another preferred embodiment, the cured polymeric binder is obtained from an isocyanate resin.

This invention also encompasses unique methods for making these lignocellulosic composite board materials. In one preferred embodiment, the hollow microspheres are blended with thermosetting resin in sufficient respective amounts that the resin is borne on the exterior surfaces of the microspheres as a surface coating effective to provide a moistened granular material. This moistened granular material is used to provide a resin source as carried upon the microspheres, instead of a resin dispersion of microspheres. The moistened granular material is thereafter conveniently admixed with wood strands in the board making procedure. In another preferred embodiment, wood flour also is combined with the microspheres when that ingredient is premixed with liquid resin in a plow type mixer before combination with the wood flakes, in order to reduce fluidization during blending of the resin and microspheres.

The lignocellulosic composites as referred to herein include the composite materials that are widely used in building and construction industry, such as oriented strand boards, particle boards, fiberboards, laminated veneer lumber, parallel strand lumber, straw boards (i.e., an agricultural by-product). The lignocellulosic composite products made according to this invention can be applied as engineered structural components in the construction and building industry. For example, the lignocellulosic composite products made according to this invention can be used as sub-flooring, wall sheathing, roof decking, concrete formers, and as forth.

For purposes herein, the term "microsphere" is not used in a strict geometric sense in connection with the filler material, and it instead refers to any nodular-shaped particle having a regular or irregular peripheral profile that includes walls enclosing one or more voids or air spaces. The microsphere can be single chambered, or, alternatively, to the extent a multiplicity of voids are enclosed by walls in a discrete microsphere particle, the microsphere is referred to herein also can be cellular or otherwise multichambered. For purposes herein, "predominantly" means at least 50%. "Surfaces" refers to external surfaces unless indicated otherwise. "Wood pieces" refers to any one or more of wood strands, flakes, chips, wafers, particles, and the like. Unless indicated otherwise, the terms "wood strands" and "wood flakes" are used interchangeably herein and refer to small discrete pieces of wood having a length dimension that exceeds the width dimension. "Discontinuously bonded" means the wood pieces are not encapsulated with resin used to attach the wood pieces together. Instead, the bond is more akin to spot bonding with a number of discrete, non-continuous surface sites of the wood pieces being adhesively attached by resin to a neighboring wood piece.

BRIEF DESCRIPTION OF THE DRAWING

The drawings are illustrative and are not necessarily drawn to scale.

DETAILED DESCRIPTION OF THE INVENTION

Figure 1:
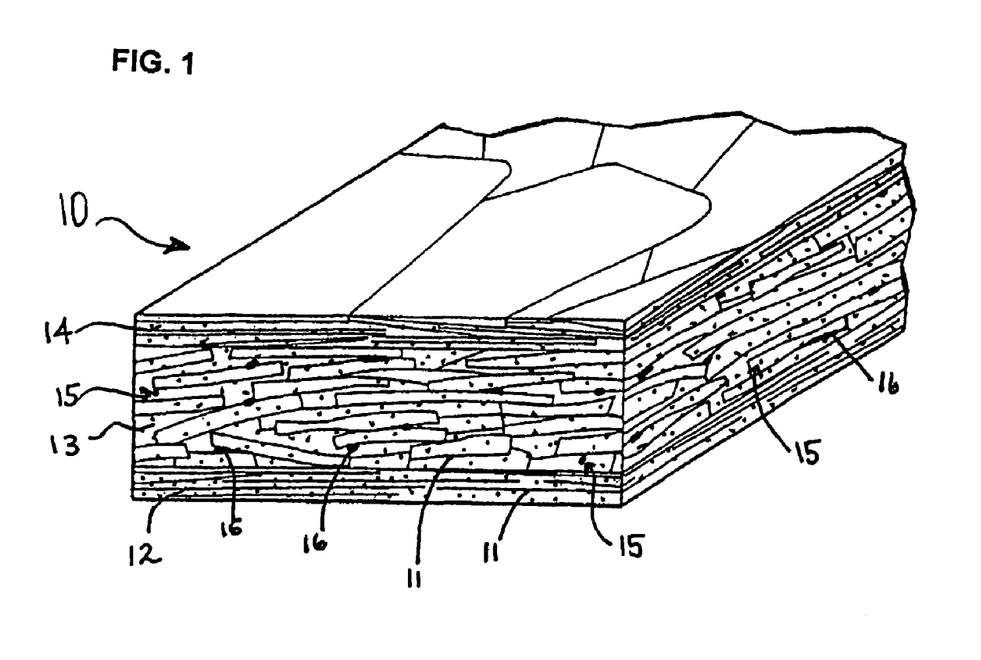
FIG. 1 is a perspective view showing an example of a composite board in accordance with an embodiment of the invention.

Referring to FIG. 1, an oriented strand board (OSB) 10 manufactured according to one embodiment of this invention is shown. The OSB 10 is comprised of multiple layers or plies 12, 13, and 14, each formed of a composite of wood flakes ("strands") bound together by resin 11. Layers 12 and 14 form the exterior or opposite surface layers of the OSB 10. However, depending on the implementation envisaged, it may be possible to have zero, one, or two or more middle or core layers.

Low density filler material 15 comprised of microspheres is dispersed in each of plies 12, 13, and 14. The microspheres are generally micron sized so the Figure is intended to be illustrative and not to scale. This invention is directed to a new filler system incorporated during flake blending processing in the manufacture of at least one or more of the plies 12, 13, and 14 of the oriented strand board (OSB) 10, or other comparable multi-layered wood composites. Although the detailed descriptions herein refer to OSB type board for convenience, it will be appreciated that the invention has wider applicability to other types of multi-layered lignocellulosic composites.

In general, in fabricating the oriented strand board 10, a surface layer (e.g., layer 12) is first formed by coating dried wood strands or flakes 13 in a blender with a thin layer of a binder composition 11 containing the hollow cellular filler material described in greater detail infra. Typically, the binder coating is discontinuous in OSB production. The OSB panel shown in the Figure also includes voids or air spaces 16, which are not attributable to the air spaces defined by the microspheres or any foam cells present. The voids 16 that normally occur in the fabrication of an OSB panel in which the strands 13 forming are discontinuously coated with resin 11. Continuous coats of resin on the strands would significantly increase the cost of the board, whereas a discontinuous coating can suffice for meeting consolidation and performance considerations.

In one embodiment, the coated flakes are then spread on a conveyor belt to provide the first ply or layer 12 having the major dimension of the flakes oriented generally parallel with the direction of conveyor belt. Then, compositions incorporating the hollow cellular filler are used to form a second ply 13 and a third ply 13 successively deposited on the first ply 12. The second ply 12 can be deposited such that its flakes are oriented in a direction generally perpendicular to the conveyor belt, while third ply 14 has flakes oriented in line with the conveyor belt, or have some other orientation scheme useful in OSB.

For example, plies built-up in this manner have flakes oriented generally perpendicular to the orientation of flakes in an adjoining ply. Alternatively, one, some, or all the plies can have strands oriented in random directions. The multiple plies or layers can be deposited using generally known multi-pass techniques and strand orienter equipment. It will be appreciated that the plurality of separate middle or core layers deposited also could have random strand orientations provided relative to adjoining surface plies having strands oriented in the machine direction. After the stack of plies is assembled, the lay-up is heat pressed to consolidate the assembly into unitary sheathing or panel 10.

In one preferred embodiment, the invention is applicable to composite lignocellulosic panel materials having relatively significant void volumes in the finished board, excluding the air space occupied by the hollow or cellular microsphere filler. For example, the present invention makes it possible in one embodiment to reduce the density of OSB board at least 5% without sacrificing bending strength in finished OSB board having at least about 5% void space, more particularly, at least 10% void space, not including void space attributable to the presence of the hollow or cellular filler or any foam cells present, relative to the same board composition except omitting the hollow or cellular filler.

In an embodiment of the present invention, a density of OSB of less than 40 pcf is achievable without resulting in large strength reductions of the processed composites. This density reduction is achieved without sacrificing strength is achieved by incorporation of the hollow cellular filler into the compositions used in manufacturing the OSB board.

In one embodiment, increases in bending strength of at least about 7%, and particularly about 7% to about 45%, are achieved when incorporating the microspheres in void-containing composite boards according to the invention. In another embodiment, the OSB made according to this invention will have a bending strength equivalent to the OSB at 42 pcf or higher made with the same composition except omitting the microspheres.

The lightweight lignocellulosic composite materials of the present invention can be widely used in the building and construction industry. They are also referred to as wood-based composite materials, mainly composed of celluloses, hemicelluloses, and lignocellulosic materials. The basic process for making these composites involves the dimensional reduction of raw lignocellulosic materials to desirable geometries and sizes (veneers or wood pieces such as flakes/strands, wafers, chips, particles, and so forth), dried to a target moisture content, incorporated with special polymeric binder materials and other special additives. The mixed components are formed into continuous or discontinuous mats. Then, they are consolidated under special heat and pressure with multi-opening or continuous pressing operation. The consolidated panels can be cut into any convenient size, such as, for example, 4 feet×8 feet sheets, with different thicknesses, dependent upon given construction applications.

As discussed above, the density of manufactured composites is one of the most important parameters that control the OSB performance in the manufacturing processes. In general, the denser the composites, the higher the mechanical property of composites will be. In addition, in a preferred embodiment, the invention is applicable to composite lignocellulosic panel materials having relatively significant void volumes in the finished board, excluding the air space occupied by the microspheres used as filler.

Hereinafter, oriented strand board or OSB will be referred to primarily in the illustrations for sake of convenience, but it should be understood that the other lignocellulosic composite "boards" may be substituted, especially those having void volumes of greater than about 5%, in which that void volume is not attributable to the microspheres or any foam cells present.

Preferred lignocellulosic materials utilized in this invention are derived from naturally occurring hard or soft woods, singularly or mixed, whether such wood is green or dried. Typically, the raw wood starting materials, either virgin or reclaimed, are cut into strands, flakes, wafers, chips, particles, and so forth, of desired shape.

In one preferred embodiment, lignocellulosic wood strand/flake materials are used that are obtained through dimensional reduction of logs into discrete strands. The sizes of these strand or flake materials, in general, are in a range of about 0.28 to about 8 inches (about 0.7 to about 15–20 cm), more particularly about 0.75 to about 5 inches, in length, and about 0.1 to about 2 inches (about 2.5 to about 5 cm) in width, and about 0.001 to about 0.040 inches (about 0.0025 to about 0.1 cm) in thickness. The moisture content of wood strands generally is in a range from 3 to 12% after being dried. Therefore, the geometrical and morphological characters of wood strands used in oriented strand board and similar flake board are completely different from natural plant fibers. A minor amount of fine particles of wood, such as wood flour, can be included in addition to the strand, wafer or flake wood materials as the lignocellulosic materials.

In general, the manufacture of the panels involves coating lignocellulosic wood materials, especially strand or flake materials, with a resin mixture comprising a polymeric thermosetting binder, microspheres and any other additives such as wood flour and wax, such that the resin mixture effectively coats the wood materials and provides a board-forming composition that can be used to form a ply or plies. The resin mixture can be spray-coated upon the wood strands, or other suitable technique. The resin coating does not form a continuous coating on the wood materials surfaces. In one embodiment, mentioned above, the coated wood materials are spread on a conveyor belt in either a random mat or oriented multi-layered mats, as indicated above.

Subsequently, the formed mats or layups will be pressed under a hot press machine, which can be a conventional type of machine used for that general purpose, which fuses and binds together the coated wood materials to form a consolidated OSB panel of various thickness and size. The panels, in one embodiment, are pressed for 2–5 minutes at a temperature of about 175° C. to about 250° C., although other temperatures may be appropriate for given lignocellulosic composites, and the resulting composite panels will have a density in the range of about 38–50 pcf (ASTM D1037-98), a thickness of about 0.25 to about 2 inches, and a void volume of at least 5% not including the void volume contributed by the microspheres.

In one embodiment, the consolidated OSB panel of the invention comprises i) generally about 70 to about 98 wt %, preferably about 75 to about 90 wt %, dried lignocellulosic material; ii) about 0.8% to about 20 wt %, preferably about 5 to about 15 wt %, total thermoset binder; iii) about 0.9 to about 20 wt %, preferably about 1 to about 5 wt %, hollow microspheres; and iv) about 0.8 to about 3 wt % additional additives.

As indicated above, it has been found in the present invention that through incorporating low density filler materials, such as hollow glass micro-spheres, hollow ceramic micro-spheres, hollow polymeric micro-spheres, and/or perlites into OSB composites, the density of OSB can be reduced at least 5%, such as from 42 to 38 pcf or less in the case of OSB panels made with southern pine strands, while maintaining its engineered board strength properties.

In one non-limiting aspect, the bending stiffness of the composite board of an embodiment of this invention exceeds 20,000 lb·in$^2$/ft, and generally ranges from about 20,000 to about 30,000 lb·in$^2$/ft. In one embodiment, the modulus of rupture of the composite board of the present invention exceeds at least about 2200 psi, preferably exceeds at least about 2750 psi, and more preferably exceeds at least about 3000 psi, and generally includes bending strength values ranging from about 2200 to about 5000 psi, and more particularly about 2500 to about 4500 psi.

Figure 2:
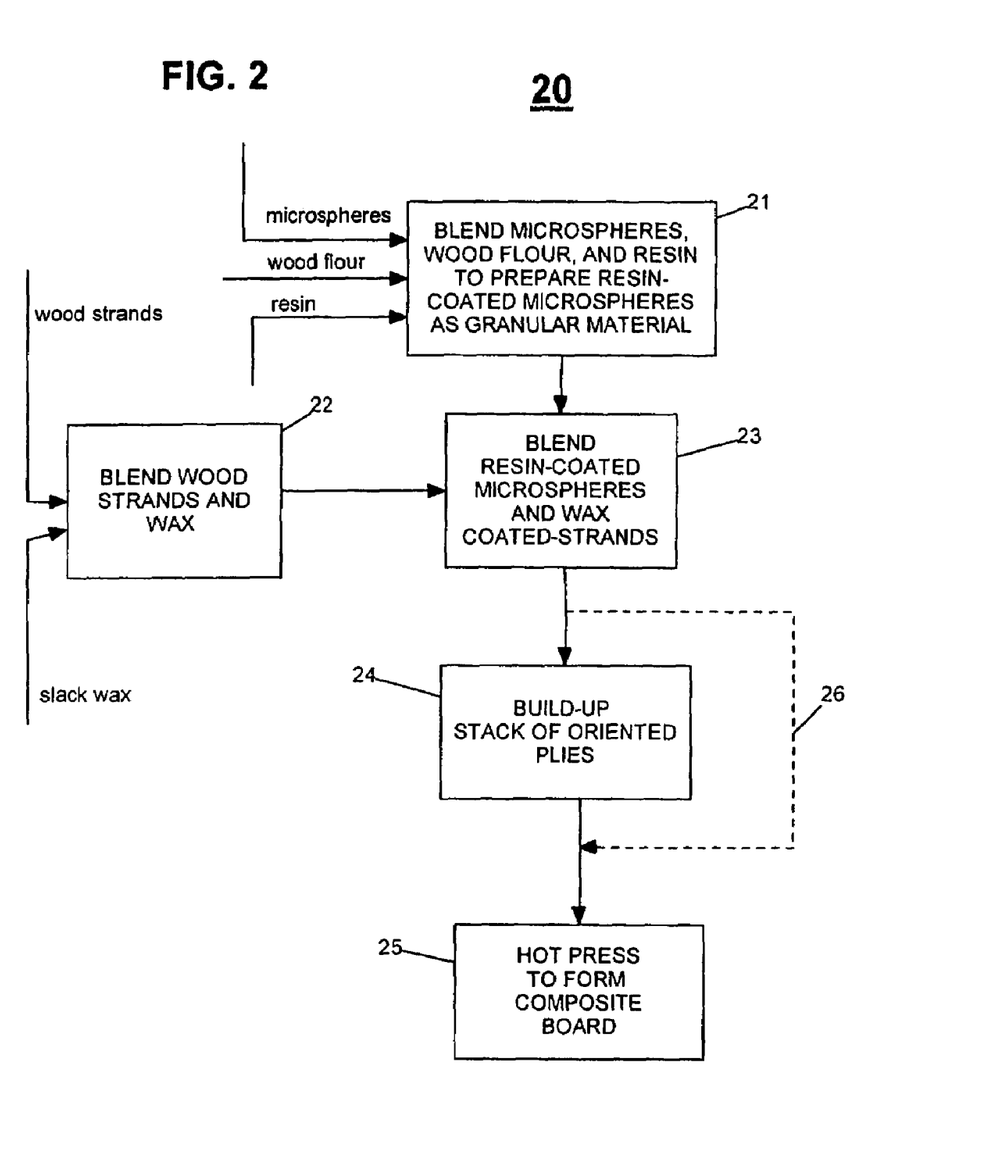
FIG. 2 is a block diagram showing a method according to an embodiment of the present invention.

This invention also encompasses a unique method for making these lignocellulosic composite board materials. Referring to FIG. 2, in one preferred method 20, the hollow microspheres are blended with a thermosetting resin, and optionally wood flour, in sufficient amounts that the resin is borne on the exterior surfaces of the microspheres effective to provide a moistened granular material (step 21). This moistened granular material is used to provide a resin source for consolidating wood flakes in subsequent processing (step 23), instead of using a resin dispersion of microspheres in which microspheres are used to bulk up a liquid phase material for casting or molding. The wood strands typically will be blended with a water repellant (step 22), such as slack wax, prior to blending with the resin-coated microspheres. The moistened granular material is thereafter conveniently admixed with wood strands in the board making procedure, and then either used to build up a stack of oriented plies (step 24) or shaped into a single play or layer (step 26), before heat-pressing the mixture to form a unified board structure (step 25).

Microsphere Filler Material for Board:

The low density fillers used in the present invention generally are hollow or cellular glass microspheres, hollow polymeric microspheres, hollow ceramic micro-spheres, natural perlites, and so forth. Among other advantages, a discovery of the present invention is that by incorporating low-density cellular filler materials, such as hollow glass microspheres (also sometimes called microballoon, macroballoon, and glass bubbles), hollow polymeric microspheres, hollow ceramic microspheres, and natural perlite materials into lignocellulosic raw materials to make composites, the density of lignocellulosic composite materials can be reduced by about 5 to about 20% while still maintaining the bending property, relative to the same board composition except omitting the low density filler material.

The hollow or cellular microsphere materials have excellent blending capacities with wood flake-resin bonded composites without flying around inside the blender, by which the blended resin mixture can be uniformly distributed, mixed with wood flake/strand components, and effectively incorporated in the current OSB manufacturing processes.

Glass and ceramic microspheres suitable for use in the present invention generally are between about 25 to about 250 microns in diameter. Polymeric microspheres suitable for use in the present invention generally are between about 10 to about 100 microns in diameter.

Suitable microspheres can include those commercially obtainable, such as those manufactured by 3M, Expancel, Pierce & Stevens Corp., or Emerson & Cuming, Inc. Perlites are natural multi-cellular hollow micro-spheres. Perlites are hydrated rhyolitic volcanic glass containing between two and five percent of chemically combined water, which permits production of an expanded cellular material of extremely low bulk density when the ore is heated to its softening temperature. The microsphere filler must have a density sufficient that it can be dispersed and suspended in the thermosetting resin without significant occurrence of any floating or sinking.

It also has been found in accordance with the present invention that pre-coating hollow micro-spheres with polymeric resin, such as isocyanate resin, permits a thin reactive layer of the resin to form on the surfaces of the hollow micro-spheres. The resulting wetted particulate material is granular-like. Then, a blending of these reactive resin-coated hollow microspheres with wood flake components in an appropriate ratio provides an easy and practical processing solution to consolidate the composite mats successfully. The resin mixture can serve as reactive low-density filler materials.

The true density of these lightweight microsphere filler materials can be in a range from 0.05 to 0.70 g/cc. In one preferred embodiment, the hollow microspheres are hollow glass microspheres with a density of 0.1 to 0.35 g/cc.

The materials used for the reactive hollow microsphere materials can be made of organic or inorganic materials such as glass, ceramic, perlite, and polymeric materials as listed in Table 1, although the invention is not limited to these materials. The shapes of these materials, in general, are generally geometrically spherical and single celled, encapsulated with air or other lightweight gaseous materials. Multi-celled microspheres with irregular shapes are also commercially available (e.g., perlite).

For example, a preferred hollow glass microsphere is the K1 microsphere, which is manufactured by 3M, St. Paul, Minn. The true density of K1 is about 0.125 g/cc, the materials are made of soda-lime-borosilicate type of inorganic materials. S22 is another hollow glass micro-sphere offered by that supplier. The difference between K1 and S22 is that K1 has a true density of 0.125 g/cc and S22 has a true density of 0.22 g/cc. The diameter of K1 microspheres is much larger than that of S22. S22 may have better crush strength than K1 spheres.

In another preferred embodiment, wood flour also is included when the microspheres are premixed with liquid resin, especially when they are premixed in a plow type mixer in order to reduce fluidization, before the resulting blend is combined with wood flakes, and the resulting composite mixture is consolidated into a board structure. The wood flour ingredient generally can have a particle size of about 50 to about 44 microns. Wood flour of 200 mesh or finer is preferred. Wood flour is commercially available in these sizes.

In one embodiment, features of the present invention involve two-step processes for incorporating the lightweight hollow microsphere materials into an oriented strand board and the like in which wood strands or flakes are discontinuously bonded at their surfaces into a unitary board structure by a resin premixture including a thermosetting resin and the hollow microspheres that are applied to those wood strand surfaces by blending and heat compression.

In one embodiment, the admixing of hollow microsphere materials with wood flour and isocyanate resin, or other thermosetting resin, before being added into blenders with wood flakes has shown advantages over a direct one-step mixing of hollow microsphere materials with the resin and wood ingredients.

In one embodiment of this process, low-density hollow microspheres are charged into a blending container. Then, fine wood flour is mixed with hollow microsphere materials in the same blending container. A polymeric thermosetting resin, such as 4,4-diphenyl-methane diisocyanate resin (MDI), is brought into the same container, such as through either airless or atomizing nozzle pressure equipment, and the ingredients blended to provide a resin pre-mixture.

In one embodiment, the preferred bulk volume of mixed hollow microsphere/wood flour will be in a range 30% to 50% of the total volume of the chambers. Excessive amounts of ingredients in the chamber will result in a poor non-uniform blending. Some low-density filler materials will create a large bulking effect during blending and the mixture will tend to fill the whole chamber of the mixer. If overly reduced amounts of ingredients are charged into the blender, the mixer will not be used to its effective capacity.

The mixer used for blending hollow microsphere materials and the resin and optionally the wood flour should also be low to medium shear equipment to minimize and avoid rupture of the hollow microsphere materials during the blending process. Enough blending time should be given to allow the mixed components to substantially uniformly coat the polymeric resin onto the surfaces of the microspheres. Enough resin should be added to provide this level of coating, but if too much resin is added, the resin-microsphere mixture will aggregate into large clumps and not be useful for uniform dispersion onto the wood flakes during subsequent processing.

An example of a blending apparatus that can be used to practice this invention is, for example, a Littleford Day M-5 mixer. The mixer is composed of five functional groups: (1) a mixing head or/and plow in the blender chamber, (2) a motor that drives the mixing head or plow, (3) control equipment for motor speed adjustment and switch for controlling time, (4) injection port for powders, liquid resin, or chemical charges, and (5) safety keys and emergency switches. The preferred rotation speed for this machine is around 250 to 300 rpm and preferred time for the mixture blinding is at least 6 minutes.

For very light hollow microsphere materials, a suspension and sticking of the hollow microsphere materials during the blending operation, especially when blending is being performed in a plow type mixer, can be inhibited by compensating the suspension and allowing the low-density hollow microsphere fillers to better disperse themselves on the wood flakes uniformly, by adding and combining wood flour with the hollow microsphere materials before blending the resulting mixture with MDI resin or other thermosetting resin.

The proportional components among the hollow microsphere, wood, and MDI resin are important for the mixture efficiency. It is believed that the wood flour plays two major roles in the mixed components, especially in plow type mixer blending situations, which are as follows. First, it is thought to be involved with formation of co-aggregations with hollow microsphere materials and MDI resin. The probabilities for the suspension of low-density filler materials can be greatly reduced due to the aggregation of wood flour/MDI/hollow microsphere materials. Secondly, it is thought to serve as an intermediate agent to bond the hollow microsphere/MDI materials in the consolidated composites. An addition of wood flour during blending of hollow microspheres and the thermosetting resin can increase the compatibilities between hollow microsphere materials and subsequently introduced wood flakes/strands.

Importantly, it has been observed that the wood flour reduces fluidization during blending of the thermosetting resin and hollow microspheres using a plow mixer in particular. The use of other types of mixers for this blending operation, such as a KitchenAid type mixer, can possibly reduce the need for wood flour for this purpose.

In one embodiment, the generally useful blending proportions of a pre-mixture of resin, hollow microspheres, and optionally wood flour, generally are, on a weight basis, about 25 to about 80% MDI resin, about 30 to about 80% hollow microspheres, and 0 to about 40% wood flour. In one embodiment, for every 100 parts by weight wood flakes/strands, about 3 to about 30 parts by weight of the resin/microsphere/wood flour pre-mixture are blended therewith during board formation. However, the optimal proportional components should be determined on a case-by-case basis for each type of hollow microsphere ("HM") used. For example, in one preferred embodiment, the proportions of the resin premixture for hollow glass microspheres selected as the K1 commercial microspheres described elsewhere herein are about 42 wt %, about 22 wt % wood flour, and about 36 wt % MDI resin. The MDI can be used in liquid or powder form, and preferably is used in liquid form.

In the second process step, pre-coated hollow microsphere/wood flour/MDI mixture is added into a cylinder blender. Either way, a surface film of the resin will form on the exterior surfaces of the hollow microspheres. The resin mixture and wood flakes are tumbled in the blender for time sufficient for thorough mixing. Normally, in a laboratory blender, it will take about 5 minutes to allow the resin mixture to mix well with wood flakes. Certainly, besides the addition of powder resin mixture, excessive MDI resin can also be sprayed simultaneously or separately.

The quantity of added resin mixture into wood flakes is dependent upon the final target density of OSB and resin mixture true density. In general, the lower the true density of mixed resin mixture, the more effective the resin mixture will be to reduce the panel density. For example, when K1 microspheres/MDI/wood flour is mixed with a proportional component at about 42%/about 36%/about 22% (by weight), the amount of resin mixture needed in combination with wood flakes is about 6.9% by wt. to decrease the regular OSB density from 42 pcf to 38 pcf.

In contrast, when S22/MDI/wood flour is mixed at about 56 wt %/about 27.5%/about 17% (by weight), respectively, the resin mixture needed is about 11.88% by wt. (oven-dried wood flakes as 100% base). The true density of K1 is about 0.125 g/cc, the true density of S22 is about 0.25 g/cc. Therefore, the K1 is two times more effective than S22 to reduce the composite density by weight. The preferred range of added resin mixture will be in a range from 3% to 30% by wt., dependent upon the resin mixture true density and final target density of manufactured composites.

The resin used as the binding resin for the wood strands and for blending with hollow microsphere materials can be a thermosetting resin. Preferred resins include an isocyanate resin such as MDI, phenol formaldehyde (powder or liquid), such as sold under the trademark RUBINATE 1840®, manufactured by Huntsman ICI and CP-460® manufactured by Tembec Company, or other types of polymeric materials such as PF resole resin, powder PF resin, etc. The preferred MDI resin includes Mondur 451, manufactured by Bayer Corp. When wood strands are coated with an isocyanate resin, it is generally understood that the major reaction mechanisms in OSB are polyurea instead of polyurethane. Heat and pressure are used to consolidate the OSB mat to increase the intimate contact between adjacent strands. The binder loading level is preferably in the range of 1–10 wt %, based upon the oven-dried wood weight, more preferably 2–5 wt %.

For 100 parts wood flakes, the preferred addition rates of the other ingredients of the composite formulation include about 3 to about 30 parts of the above-described resin/microsphere/wood flour premixture, which is blended directly with the wood flakes, about 1 to about 3 parts wax, and about 0 to about 3 additional parts of MDI resin as sprayed on the wood flake surfaces.

Wax can be included in the composite-forming mixture to impart improved water repellency. The wax additive is commonly employed to enhance the resistance of the OSB panels to absorb moisture. Wax provides good dimensional stability through physical blocking the connection of wood surface hydrophilic functional sites from water and vapor molecules. The added wax can be slack melt solid wax or liquid emulsified wax. Preferred waxes are slack wax or a microcrystalline wax. The wax loading level is preferably in the range of 0.5 to 2.5 wt % based on the oven-dried wood weight.

After blending the resin mixture with wood flakes/strands and wax in the blender, an OSB mat can be formed using a wood box. A hot press machine can be used to consolidate the composites under special hot press conditions.

It was found in the invention, that beside the true density of hollow microsphere materials, the particle sizes of hollow microsphere materials, types of the hollow microsphere materials, surface treatment of the materials would significantly affect the strength performance of the hollow microsphere OSB. Hollow microsphere materials with large particle sizes and low density are preferred in the hollow microsphere selection.

The following examples serve to further illustrate, but not limit, some of the preferred embodiment of the invention. Unless indicated otherwise, all amounts, proportions, and ratios herein are by weight.

EXAMPLES

The following are the examples representing the present invention and comparison runs. The lightweight lignocellulosic composite material and its method of being manufactured in accordance with the present invention will be explained in more detail in the followed examples.

Table 1 lists some exemplary hollow microsphere materials useful in the practice of the invention, including those used in the experimental runs described herein. Table 2 lists the calculated amount of resin mixture added into the OSB by replacing 20% volume of wood flake/strands with the resin mixture for each experimental run.

TABLE 1

Summary of Hollow Microspheres (HM) Used in Examples: Properties and characters

| Example | HM Brand Name | Surface Treatment | Size/Density (μ/g/cc) | Raw Material Source |
|---|---|---|---|---|
| Regular Hollow Glass Micro-spheres ||||| 
| 1 | K1 | None | 65/0.125 | 3M |
| 2 | S22 | None | 20/0.22 | 3M |
| Surface Treated Hollow Glass Micro-spheres |||||
| 3 | A16/500 | MCC* | 70/0.16 | 3M |
| 4 | H20/1000 | Epoxy Silane | 60/0.20 | 3M |
| Regular Hollow Ceramic Spheres |||||
| 5 | G3500 | None | 130/0.7 | 3M |
| Hollow Polymeric Micro-spheres |||||
| 6 | Dualite 6001 | PVDC | 50/0.13 | Pierce & Stevens Corp. |
| 7 | Dualite 7020 | PAN | 30/0.13 | Pierce & Stevens Corp. |
| Perlite (multi-cell micro-spheres) |||||
| 8 | 35BC | None | 40/0.25 | Silibrico Corp. |

TABLE 2

Experimental OSB run conditions.

| Exp. Run No. | Brand Name Of HM | HM Density (g/cc) | Target Density (pcf) | Total resin Mixture By Wt. | Proportional Components by Wt. |||
|---|---|---|---|---|---|---|---|
| | | | | | Wood | MDI | HM |
| 1 | None | — | — | — | — | — | — |
| Untreated Hollow Glass Microspheres ||||||||
| 2 | K1 | 0.125 | 36.80 | 9.424 | 0.222 | 0.362 | 0.416 |
| 3 | S22 | 0.22 | 37.81 | 12.66 | 0.169 | 0.275 | 0.556 |
| Surface Treated Hollow Glass Microspheres ||||||||
| 4 | A16/500 | 0.16 | 37.17 | 10.74 | 0.199 | 0.324 | 0.477 |
| 5 | H20/1000 | 0.20 | 37.60 | 12.02 | 0.178 | 0.290 | 0.532 |
| Hollow Ceramic Microspheres ||||||||
| 6 | G3500 | 0.70 | 42.92 | 28.03 | 0.076 | 0.124 | 0.799 |
| Hollow Polymeric Microspheres ||||||||
| 7 | Dualite 6001 | 0.13 | 36.85 | 9.78 | 0.218 | 0.356 | 0.425 |
| 8 | Dualite 7020 | 0.13 | 36.85 | 9.78 | 0.218 | 0.356 | 0.425 |
| 9 | 35BC | 0.25 | 38.13 | 13.63 | 0.157 | 0.256 | 0.587 |
| 10 | K1* | 0.125 | 36.80 | 9.624 | 0.222 | 0.362 | 0.416 |

Note:
*The resin mixture is used for the core layer of OSB.

Preparation of Lignocellulosic Composite Materials for these examples was performed in the following manner:

(a) Preparation of Resin Mixture:

The method used for making the composite pre-blending the resin binders containing the microspheres in a Littleford mixer or other suitable mixer to obtain a uniform resin/microsphere coating on the hollow microsphere (HM) surface and wood flours with MDI resin. The blending procedure included: (1) charging the Littleford mixer (Littleford Day M-5 mixer) with HM powder materials, (2): charging the Littleford with wood flour materials, (3): charging the Littleford with MDI resin and blending the MDI resin at a rotation speed of about 220–250 rpm with dial number setting at 9 for about 6 minutes before discharging the whole mixture and packed into plastic bags.

(b) OSB Panel Making Experiments:

Oven dried wood flakes (MC % :3–5%) were blended in a cylinder blender either with the powder resin mixture or sprayed with 100% MDI resin as control, as indicated below. The following general process conditions were used for making OSB panels:

(1) Panel dimension: 20 inch×20 inch.
(2) Flake Orientation: Random for ⅜ inch OSB and perpendicular for ¾ inch OSB.
(3) Layered structure: Single, three, or 5 layers.
Hot Press Conditions:
Press temperature: 400° F.
Press closing time: 30–45 seconds.
Press cooking time: 140 seconds.
Press de-gas time: 30 seconds.

Multiple OSB panels were made for each condition, and the average result reported for several tests conducted on separate ones of each batch, as indicated below.

(c): Cutting of OSB Panels:

(1): Three pieces for bending test and density (MOR, MOE, and EI).
(2): Two pieces for 24 hour water soaking test.
(3): Five pieces for 2 inch×2 inch of internal bonding (IB) samples were selected from 10 cut IB samples for each OSB panel. The examples are described in more detail below.

Example 1

5303 grams of wood flakes coated with 1% slack wax (moisture content: 4.5%) was placed in a blender and 174 grams of MDI resin was sprayed on the wood flakes, then, the mixture was tumbled for about 5 minutes in the blender. About 1660 grams of these wood flakes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate the hot press condition as described previously to be pressed into the target thickness of 0.375 inch.

The above panel making condition will be repeated for two times. Therefore, total 3 OSB panels will be obtained.

Example 2

4326 grams wood of flakes coated with 1% slack wax (moisture content: 3.0%) was placed in a blender and a resin mixture of K1/MDl/wood flour with a proportional component of 0.416/0.362/0.222 by wt. was prepared using a Littleford Day-5 M mixer. 91.5 grams of K1 hollow glass microspheres (3M) was first charged into the Littleford mixer, then, 48.84 grams of wood flour (T100), obtained from Ace International Inc., was charged into the Littleford. Then, the lid of Littleford mixer was closed and the Littleford was turned on with a rotation speed of 250 rpm. Then, about 79.7 grams of MDI resin was injected through an open slot on the top of the mixer in about 60 to 90 seconds. The time for the mixture to blend is controlled for about 6 minutes. Then, the mixture is collected into plastic zip-loc bags. This resin mixture process will be repeated one more time to make up the resin mixture of 440 grams.

About 400.0 grams of the above resin mixture was directly mixed with the wood flakes coated with 1% slack wax, then, the mixture was tumbled for about 5 minutes in the blender. About 1432.3 grams of these furnishes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate using the hot press conditions as described in example 1 to be pressed into the target thickness of 0.375 inch.

Example 3

4326 grams of wood flakes coated with 1% slack wax (moisture content: 3.0%) was placed in a blender and a resin mixture of S22 microspheres/MDI/wood flour with a proportional component of 0.556/0.2752/0. 1687 by wt. was prepared using a Littleford Day-5 M mixer. 155.7 grams of 822 hollow glass microspheres (3M) was first charged into the Littleford mixer, then, 47.2 grams of wood flour (T100) was charged into the Littleford. Then, the lid of Littleford mixer was closed and the Littleford was turned on with a rotation speed of 250 rpm. Then, about 77.1 gram of MDI resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 560 gram.

About 526 grams of the above resin mixture was directly mixed with 4326 grams of wood flakes coated with 1% slack wax, then, the mixture was tumbled for about 5 minutes in the blender. About 147 grams of these furnishes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate using the hot press conditions as described in Example 1 to be pressed into the target thickness of 0.375 inch.

Example 4

4326 grams of wood flakes coated with 1% slack wax (moisture content: 3.0%) was placed in a blender and a resin mixture of A16/500 hollow microspheres (3M)/MDI/wood flour with a proportional component of 0.477/0.324/0. 199 by wt. was prepared using a Littleford Day-5 M mixer. 119.2 gram of A16/500 hollow glass microspheres (3M) was first charged into the Littleford mixer, then, 49.7 gram wood flour (T100) was charged into the Littleford. Then, the lid of the Littleford mixer was closed and the Littleford was turned on with a rotation speed of 250 rpm. Then, about 81.1 gram of MDI resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 500 grams.

About 447 grams of the above resin mixture was directly mixed with 4326 grams of wood flakes coated with 1% slack wax, then, the mixture was tumbled for about 5 minutes. in the blender. About 1458.9 grams of these furnishes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate using the hot press conditions as described in example 1 to be pressed into the target thickness of 0.375 inch.

Example 5

4389 grams of wood flakes coated with 1% slack wax (moisture content: 4.5%) was placed in a blender and a resin mixture of H20/1000 hollow microspheres (3M)/MDI/wood flour with a proportional component of 0.5324/0.2899/0.1777 by wt. was prepared using a Littleford Day-5 M mixer. 146.4 grams of H20/1000 hollow glass microspheres (3M) was first charged into the Littleford mixer, then, 48.9 grams of wood flour (T100) was charged into the Littleford. Then, the lid of Littleford mixer was closed and the Littleford was turned on with a rotation speed of 250 rpm. Then, about 79.7 grams of MDI resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 500 grams.

About 500 grams of the above resin mixture was directly mixed with 4389 grams of wood flakes coated with 1% slack wax, then, the mixture was tumbled for about 5 minutes in the blender. About 1482 grams of these furnishes were randomly spread in a 20 inch×20 inch forming box to obtain one piece of OSB panel. On the top and bottom of formed mats, release papers were used to prevent the MDI resin from sticking to the platens. The formed mat was placed in a 24 inch×24 inch hydraulic hot press to consolidate using the hot press conditions as described in example 1 to be pressed into the target thickness of 0.375 inch.

Example 6

4390 grams of wood flakes coated with 1% slack wax (moisture content: 4.5%) was placed in a blender and a resin mixture of G3500 hollow microspheres (3M)/MDI/wood flour with a proportional component of 0.799/0.124/0.076 by wt. was prepared using a Littleford Day-5 M mixer. 516.2 grams of G3500 hollow ceramic microspheres (3M) was first charged into the Littleford mixer, then, 49.5 grams of wood flour (T100) was charged into the Littleford. The lid of Littleford mixer was closed and the Littleford was turned on with a rotation speed of 250 rpm. Then, about 80.8 grams of MDI resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 1300 grams.

About 1164 grams of the above resin mixture was directly mixed with 4390 grams of wood flakes coated with 1% slack wax, then, the mixture was tumbled for about 5 minutes in the blender. About 1683 grams of these furnishes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate using the hot press conditions as described in Example 1 to be pressed into the target thickness of 0.375 inch.

Example 7

4388 grams of wood flakes coated with 1% slack wax (moisture content: 4.5%) was placed in a blender and a resin mixture of Dualite 6001 hollow microspheres (Pierce & Stevens Corp.)/MDI/wood flour with a proportional component of 0.425/0.356/0.218 by wt. was prepared using a Littleford Day-5 M mixer. 95.7 grams Dualite 6001 hollow polymeric micro-sphere (Pierce & Stevens Corp.) was first charged into the Littleford mixer, then, 49.1 grams of wood flour (T100) was charged into the Littleford. The lid of Littleford mixer was closed and the Littleford was turned on with a rotation speed of 250 rpm. Then, about 80.9 grams of MDl resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 450 grams.

About 406.3 grams of the above resin mixture was directly mixed with 4388 grams of wood flakes coated with 1% slack wax, then, the mixture was tumbled for about 5 minutes in the blender. About 1453 grams of these furnishes were randomly spread in a 20 inch×20 inch forming box to obtain one piece of OSB panel. On the top and bottom of formed mats, release papers were used to prevent the MDI resin from sticking to the hot platens. The formed mat was placed in a 24 inch×24 inch hydraulic hot press to consolidate using the hot press conditions as described in example 1 to be pressed into the target thickness of 0.375 inch.

Example 8

4389 grams of wood flakes coated with 1% slack wax (moisture content: 4.5%) was placed in a blender and a resin mixture of Dualite 7020/MDI/wood flour with a proportional component of 0.425/0.356/0.218 by wt. was prepared using a Littleford Day-5 M mixer. 90.5 grams Dualite 7020 hollow polymeric micro-sphere (Pierce & Stevens Corp.) was first charged into the Littleford mixer, then, 49.1 grams wood flour (T100) was charged into the Littleford. The lid of Littleford mixer was closed and the Littleford was turned on with a rotation speed of 250 rpm. Then, about 80.2 grams of MDI resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 450 grams.

About 406.4 grams the above resin mixture was directly mixed with 4389 grams wood flakes coated with 1% slack wax, then, the mixture was tumbled for about 5 minutes in the blender. About 1453 grams of these furnishes were randomly spread in a 20 inch×20 inch forming box to obtain one piece of OSB panel. On the top and bottom of formed mats, release papers were used to prevent the MDI from sticking to the hot platens. The formed mat was placed in a 24 inch×24 inch hydraulic hot press to consolidate using the hot press conditions as described in Example 1 to be pressed into the target thickness of 0.375 inch.

Example 9

4389 grams of wood flakes coated with 1% slack wax (moisture content: 4.5%) was placed in a blender and a resin mixture of 35BC hollow polymeric microspheres (Silibrico Corp.)/MDI/wood flour with a proportional component of 0.587/0.265/0.157 by wt. was prepared using a Littleford Day-5 M mixer. 176.2 grams of 35BC hollow polymeric microspheres (Silibrico Corp.) was first charged into the Littleford mixer, then, 47.0 grams of wood flour (T100) was charged into the Littleford. The lid of Littleford mixer was closed and the Littleford was turned on with a rotation speed of 250 rpm. Then, about 76.75 grams of MD1 resin was injected through an open slot on the top of the mixer in about 60 to 90 seconds. The time for the mixture to blend is controlled for about 6 minutes. The mixture is collected into plastic zip-loc bags. This resin mixture process will be repeated one more time to make up the resin mixture of 600 grams.

About 566.1 grams the above resin mixture was directly mixed with 4389 grams of wood flakes coated with 1% slack wax, then, the mixture was tumbled for about 5 minutes. in the blender. About 1501.6 grams of these furnishes were randomly spread in a 20 inch×20 inch forming box to obtain one piece of OSB panel. On the top and bottom of formed mats, release papers were used to prevent the MDI from sticking to the hot platens. The formed mat was placed in a 24 inch×24 inch hydraulic hot press to consolidate using the hot press conditions as described in example 1 to be pressed into the target thickness of 0.375 inch.

Example 10

4242 grams of wood flakes coated with 1% slack wax (moisture content: 4.5%) was placed in a blender and 139.0 grams of MDI resin was sprayed-on these wood flakes following procedure as Example I. A resin mixture of K1 hollow microspheres (3M)/MDI/wood flour with a proportional component of 0.416/0.362/0.222 by wt. was prepared using a Littleford Day-5 M mixer. In the process, 124.7 grams of K1 hollow microspheres (3M Corp.) was first charged into the Littleford mixer, then, 66.6 grams of wood flour (T100) was charged into the Littleford. The lid of Littleford mixer was closed and the Littleford was turned on with a rotation speed of 250 rpm. Then, about 108.7 grams of MDI resin was mixed through an open slot on the top of the mixer in about 60 to 90 seconds with a cone funnel by gravity. The time for the mixture to blend is controlled for about 6 minutes. Then, the mixture is collected into zip plastic bags. This resin mixture process will be repeated two more times to make up about 900 grams of resin mixture.

About 664 grams of the above wood flakes treated with MDI resin is randomly laid up in the 20 inch×20 inch forming box. On the top of this bottom layer of wood flakes, 200 grams of resin mixture was spread using a sieve to distribute the whole powder resin mixture as uniform as possible. Therefore, the powder resin mixture can serve as the core layer of the OSB. On the top of the core layer, another 664 grams of wood flakes are laid up randomly. On the top and bottom of formed mats, release papers were used to prevent the MDI resin from sticking to the hot platens. The formed mat was placed in a 24 inch×24 inch hydraulic hot press to consolidate using the hot press conditions as described in Example 1 to be pressed into the target thickness of 0.375 inch.

The OSB samples of the experimental runs were subsequently cut into specific sizes and the following physical properties measured using the test procedures disclosed in ASTM D1037-98:
(1) Modulus of elasticity (MOE)
(2) Modulus of rupture (MOR)
(3) Internal Bonding (IB)
(4) 24 Hour thickness swelling (TS)
(5) Density of the Tested Panels (pcf)
(6) Bending Stiffness (modulus of elasticity * moment of inertia=EI)

TABLE 3

Summary of Tested HM OSB Properties (by Example Number)

Means of All Tested OSB Properties

| Ex. (Run) | HM Mat'ls | Density (pcf) | MOE (psi) | MOR (psi) | EI (lb in$^2$/ft) | IB (psi) | TS % 1" (%) | TS % edge (%) |
|---|---|---|---|---|---|---|---|---|
| 1 | Ctrl. | 41.5 | 523138 | 4371 | 20395 | 96.7 | 15.36 | 21.98 |
| *Untreated Hollow Glass Microspheres* | | | | | | | | |
| 2 | K1 | 38.42 | 473429 | 2956 | 23098 | 58.0 | 21.86 | 27.07 |
| 3 | S22 | 37.91 | 456814 | 2409 | 22140 | 44.5 | 21.89 | 28.56 |
| *Surface Treated Hollow Glass Microspheres* | | | | | | | | |
| 4 | A16/500 | 39.20 | 581692 | 3573 | 28367 | 64.83 | 21.93 | 25.46 |
| 5 | H20/1000 | 38.27 | 544674 | 3515 | 25497 | 86.07 | 18.09 | 23.88 |
| *Hollow Ceramic Microspheres* | | | | | | | | |
| 6 | G3500 | 42.27 | 450014 | 2321 | 25786 | 52.73 | 33.58 | 37.83 |
| *Hollow Polymeric Microspheres* | | | | | | | | |
| 7 | Dualite 6001 | 38.52 | 477319 | 3032 | 23359 | 56.90 | 15.44 | 22.94 |
| 8 | Dualite 7020 | 38.85 | 488492 | 3296 | 24185 | 67.48 | 18.04 | 23.88 |
| 9 | 35BC | 39.01 | 441741 | 2687 | 23141 | 60.19 | 35.66 | 36.71 |
| 10 | K1* | 42.34 | 563811 | 4488 | 27214 | 116.1 | 12.70 | 18.52 |

Note:
*The panel was made with the same resin mixture formulation as example 2 except that the resin mixture was laid in the core layer of OSB. 3.48% of MDI resin was sprayed on the surface of both top and bottom layers of wood flakes.

TABLE 4

Summary of Tested HM OSB Properties (by Example Number)

Standard Deviation of All Tested OSB Properties

| Ex. | HM Mat'ls | Density (pcf) | MOE (psi) | MOR (psi) | EI (lb in$^2$/ft) | IB (psi) | TS % 1" (%) | TS % edge (%) |
|---|---|---|---|---|---|---|---|---|
| 1 | Ctrl. | 3.64 | 104000 | 1215 | 6494 | 34.6 | 4.42 | 3.53 |
| *Untreated Hollow Glass Microspheres* | | | | | | | | |
| 2 | K1 | 3.34 | 132000 | 1012 | 6322 | 14.4 | 3.10 | 3.23 |
| 3 | S22 | 3.02 | 122000 | 669 | 7760 | 17.9 | 5.45 | 6.01 |
| *Surface Treated Hollow Glass Microspheres* | | | | | | | | |
| 4 | A16/500 | 2.48 | 104000 | 1020 | 5426 | 22.2 | 3.63 | 2.36 |
| 5 | H20/1000 | 2.10 | 90000 | 871 | 4084 | 17.3 | 2.61 | 2.68 |
| *Hollow Ceramic Microspheres* | | | | | | | | |
| 6 | G3500 | 3.25 | 99000 | 558 | 5685 | 19.3 | 4.45 | 3.47 |
| *Hollow Polymeric Microspheres* | | | | | | | | |
| 7 | Dualite 6001 | 4.31 | 181000 | 1401 | 8766 | 18.3 | 2.28 | 2.83 |
| 8 | Dualite 7020 | 3.53 | 156000 | 1313 | 8128 | 15.2 | 7.86 | 7.00 |
| 9 | 35BC | 4.19 | 59000 | 647 | 3353 | 18.4 | 5.66 | 5.84 |
| 10 | K1* | 5.23 | 62000 | 1296 | 3653 | 14.4 | 1.78 | 2.27 |

TABLE 5

Statistical Summary of HM OSB Using Fisher's Pairwise Comparison (ctrl. Vs others)

| Ex. | HM Mat'ls | Density (pcf) | MOE (psi) | MOR (psi) | EI (lb_in²/ft) | IB (psi) | TS % 1" (%) | TS % edge (%) |
|---|---|---|---|---|---|---|---|---|
| 1 | Ctrl. | 0 | 0 | 0 | 0 | 0 | 0 | 0 |

Untreated Hollow Glass Microspheres

| 2 | K1 | − | = | − | − | − | + | = |
| 3 | S22 | − | = | = | − | − | = | = |

Surface Treated Hollow Glass Microspheres

| 4 | A16/500 | = | = | − | = | − | = | = |
| 5 | H20/1000 | = | = | − | = | = | = | = |

Hollow Ceramic Microspheres

| 6 | G3500 | = | = | − | = | − | + | + |

Hollow Polymeric Microspheres

| 7 | Dualite 6001 | = | = | − | − | − | = | = |
| 8 | Dualite 7020 | = | = | − | = | − | = | = |
| 9 | 35BC | = | = | − | − | − | + | + |
| 10 | K1* | = | = | − | = | = | = | = |

Note:
Confidential value of comparison at α = 0.05.

The means and standard deviations of HM OSB properties are summarized in Tables 3 and 4. The Fisher's pair-wise comparison of different hollow microsphere OSB with control OSB is listed in Tables 5 and 6. Evidently the hollow microsphere OSB made of K1, S22, Dualite 6001, and Dualite 7020, AI6/500, H20/1000 have a mean density around 38 pounds per cubic feet. In contrast, the density of G3500 hollow microsphere OSB had a similar density as the regular control OSB density. In all the above hollow microsphere OSB, a 20% volume replacement of control OSB with the hollow microsphere resin mixture was assumed to all tested panels.

In general, the final density of manufactured OSB is a function of added hollow microsphere true density. Both K1 and S22 hollow microspheres provided statistically significant reduction of their density from 42 pcf to 38 pcf in comparison with the regular 42 pcf OSB as listed in Table 3. These panels have an equivalent stiffness performance as the regular OSB. Clearly, the lower the true density of the hollow microsphere is, the lighter the hollow microsphere OSB will be, all other things equal. This can be demonstrated by the factor that K1 is the most effective low-density fillers in the included hollow microsphere materials. In contrast, much less efficiency of reducing the OSB density in the experimental Example 6 (G3500 hollow microsphere OSB) is clearly shown even though 28.03% resin mixture is added into the hollow microsphere OSB. Its density remains about 42 pcf). No reduction in density took place in those panels.

TABLE 6

Effect of Surface Treatment on HM OSB (Fisher's Comparison)
Comparison between K1 OSB and Surface Treated OSB
(Fisher's Comparison)

| Exp. Run | [Means of Untreated K1 HM OSB (run 2) - treated HM OSB] | | | | | | |
|---|---|---|---|---|---|---|---|
| | Density | MOE | MOR | EI | IB | TS % 1" | TS % edge |
| 4 | = | + | = | + | = | = | = |
| 5 | = | = | = | = | + | = | = |

Surface modification of reinforced fibers is widely used in composite industry to increase the compatibilities between the reinforced fibers and polymeric matrices. Dependent upon the matrix material properties, surface treated fibers could show great synergistic effects and make significant strength improvement to the overall performance of composites. Table 6 shows that a right surface treatment to the hollow microsphere surface with epoxy silane coupling agent will result in a significant improvement to the interfacial adhesion of hollow microsphere OSB because the IB for Example 5 was significantly increased. In contrast, the hollow microspheres provided with a surface treatment using a methacrylato chromic chloride (MCC) coupling agent show similar performance as regular untreated hollow microsphere OSB (Example 4).

While the invention has been described in terms of its preferred embodiments, those skilled in the art will recognize that the invention can be practiced with modification within the spirit and scope of the appended claims.

What is claimed is:

1. A lignocellulosic composite board material comprising in admixture, a cured polymeric binder; hollow microspheres contacted at surfaces thereof by a resin; predominantly lignocellulosic wood pieces; wood flour, and an effective amount of a water repellent agent; wherein the wood pieces are discontinuously bonded together by the binder.

2. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and the board material has a density reduction of at least a 5% reduction relative to the same board material except omitting the microspheres.

3. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and the bending strength is increased relative to the board material having the same composition except omitting the microspheres.

4. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and the lignocellulosic composite is oriented strand board having a void volume of at least 5% not attributable to the microspheres or any foam cells present.

5. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and the hollow microsphere materials comprise hollow glass microspheres with a density of 0.1 to 0.35 g/cc.

6. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and wherein the board comprises on a weight basis, about 70 to 96 wt % dried lignocellulosic material; about 20 to about 0.8% wt % total cured polymeric binder; about 12 to about 0.9 wt % hollow microspheres; and about 3 to about 0.8 wt % additional additives.

7. A lignocellulosic composite board material comprising in admixture, a cured polymeric binder; hollow microspheres contacted at surfaces thereof by the resin; and predominantly lignocellulosic wood pieces, wherein the wood pieces are discontinuously bonded together by the binder and wherein the additional additives include slack wax and wood flour.

8. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and wherein the board material has a density of less than 40 pcf.

9. A lignocellulosic composite board material comprising in admixture, a cured polymeric binder; hollow microspheres contacted at surfaces thereof by a resin; and predominantly lignocellulosic wood pieces, wherein the wood pieces are discontinuously bonded together by the binder and wherein the board material has a density of less than 38 pcf and a bending strength greater than the board material having the same composition except without the microspheres.

10. A method for making a lignocellulosic composite board material, comprising:
admixing hollow microspheres with a curable polymeric binder to form a binder-coated granular material;
combining lignocellulosic wood pieces with the binder-coated granular material to provide a composite-forming mixture;
consolidating the composite-forming mixture under heat and pressure effective to form a composite board in which the wood pieces are discontinuously bonded with a resin wherein the hollow microspheres are blended with wood flour before the admixing with the curable polymeric binder to form the binder-coated granular material.

11. A method for making a lignocellulosic composite board material, comprising:
admixing hollow microspheres with a curable polymeric binder to form a binder-coated granular material;
combining lignocellulosic wood pieces with the binder-coated granular material to provide a composite-forming mixture;
consolidating the composite-forming mixture under heat and pressure effective to form a composite board in which the wood pieces are discontinuously bonded with the resin wherein the composite-forming mixture comprises about 70 to about 96 wt % dried lignocellulosic wood pieces; about 20 to about 0.8% wt % total curable binder; about 12 to about 0.9 wt % hollow microspheres; and about 3 to about 0.8 wt % additional additives.

12. The method of claim 11, wherein the additional additives include slack wax and wood flour.

13. A method for making a lignocellulosic composite board material, comprising:
admixing hollow microspheres with a curable polymeric binder to form a binder-coated granular material;
combining lignocellulosic wood pieces with the binder-coated granular material to provide a composite-forming mixture;
consolidating the composite-forming mixture under heat and pressure effective to form a composite board in which the wood pieces are discontinuously bonded with the resin wherein the wood pieces comprise wood strands, and wherein the admixing and combining steps are repeated several times to deposit plies on top of each other, prior to the consolidating of the resulting layup into the board, and the wood strands on top and bottom plies are sprayed with MDI resin.

14. A method for making a lignocellulosic composite board material, comprising:
admixing hollow microspheres with a curable polymeric binder to form a binder-coated granular material;
combining lignocellulosic wood pieces with the binder-coated granular material to provide a composite-forming mixture;
consolidating the composite-forming mixture under heat and pressure effective to form a composite board in which the wood pieces are discontinuously bonded with the resin wherein the wood pieces comprise wood strands, and wherein the admixing and combining steps are repeated several times to deposit plies on top of each other, prior to the consolidating of the resulting layup into the board, and the orientation of the wood strands is randomly oriented or directionally oriented with respect to each ply of the layup.

15. A method for making a lignocellulosic composite board material, comprising:
admixing hollow microspheres with a curable polymeric binder to form a binder-coated granular material;
combining lignocellulosic wood pieces with the binder-coated granular material to provide a composite-forming mixture;
consolidating the composite-forming mixture under heat and pressure effective to form a composite board in which the wood pieces are discontinuously bonded with the resin wherein the wood pieces comprise wood strands, and wherein the admixing and combining steps are repeated several times to deposit plies on top of each other, prior to the consolidating of the resulting layup into the board, and the orientation of the wood strands is unidirectional with respect to each ply of the layup.

* * * * *